US006403245B1

(12) United States Patent
Hunt

(10) Patent No.: US 6,403,245 B1
(45) Date of Patent: Jun. 11, 2002

(54) MATERIALS AND PROCESSES FOR PROVIDING FUEL CELLS AND ACTIVE MEMBRANES

(75) Inventor: Andrew T. Hunt, Atlanta, GA (US)

(73) Assignee: MicroCoating Technologies, Inc., Atlanta, GA (US)

( * ) Notice: Subject to any disclaimer, the term of this patent is extended or adjusted under 35 U.S.C. 154(b) by 0 days.

(21) Appl. No.: 09/316,855

(22) Filed: May 21, 1999

(51) Int. Cl.$^7$ .......................... H01M 8/10; H01M 4/86; H01M 4/88; H01M 4/90
(52) U.S. Cl. .............................. 429/33; 429/30; 429/42; 429/44; 502/101; 427/115
(58) Field of Search ..................... 429/30–33, 42–44; 502/101; 427/115

(56) References Cited

U.S. PATENT DOCUMENTS

| | | | | |
|---|---|---|---|---|
| 5,211,984 A | * | 5/1993 | Wilson | 427/115 |
| 5,716,664 A | * | 2/1998 | Marchetti | 429/42 |
| 5,840,438 A | | 11/1998 | Johnson et al. | 429/39 |
| 5,853,798 A | | 12/1998 | Dube | 427/125 |
| 5,861,222 A | * | 1/1999 | Fischer et al. | 429/42 |
| 5,863,610 A | * | 1/1999 | Young et al. | 427/335 |
| 5,863,673 A | | 1/1999 | Campbell et al. | 429/44 |
| 5,879,827 A | | 3/1999 | Debe et al. | 429/40 |
| 5,879,828 A | | 3/1999 | Debe et al. | 429/41 |
| 5,882,810 A | | 3/1999 | Mussell et al. | 429/33 |
| 5,885,729 A | | 3/1999 | Marchetti | 429/42 |

FOREIGN PATENT DOCUMENTS

| | | | | |
|---|---|---|---|---|
| EP | 0577291 A1 | * | 1/1994 | H01M/8/10 |
| EP | 0875 950 A2 | | 12/1997 | |
| EP | 0 874 413 A2 | | 10/1998 | |
| EP | 0814 520 A2 | | 11/1998 | |
| WO | WO 96/13073 | | 5/1996 | |
| WO | WO 96/29752 | | 9/1996 | |

* cited by examiner

*Primary Examiner*—Mark F. Huff
*Assistant Examiner*—Daborah Chacko-Davis
(74) *Attorney, Agent, or Firm*—Wayne E. Nacker; Alfred H. Muratori; Edward J. Kelly

(57) ABSTRACT

The materials and processes for forming fuel cell electrodes can include substrates of codeposited materials including an electrically conductive material, such as graphite, a polymer film, such as a proton-exchange membrane, and a catalytic material, such as platinum. The material may be applied to a polymer film by combustion chemical vapor deposition (CCVD) to produce a layered membrane, or the polymer may be deposited simultaneously with the catalytic coating to produce a membrane wherein the layers are intermingled. Proton exchange membranes prepared by this method are useful in the manufacture of fuel cells.

56 Claims, 8 Drawing Sheets

MATERIALS AND PROCESSES FOR PROVIDING FUEL CELLS AND ACTIVE MEMBRANES

FIELD OF THE INVENTION

The systems and methods described herein relate to materials and processes for manufacturing membrane assemblies employed to catalyze reactions, and, more particularly, to materials and processes for forming a membrane-electrode assembly of a fuel cell.

BACKGROUND OF THE INVENTION

Fuel cell technology is set to play a major role in the fuel and power industries in the next few years. In fact, by the year 2010, about 130 gigawatts of fuel cell based generating capacity will be installed in the US and nearly 550 gigawatts worldwide. Platinum-based Fuel Cells Find Commercial Use, Metals Week, Feb. 19, 1996. Most of these installations will be power-plant facilities that act as central power-plants, industrial generators, and commercial/residential generators. These power-plants will employ Phosphoric Acid Fuel Cells (PAFCs), which are the most commercially developed fuel cells, typically use 90 ozs. of platinum in a 500 kw unit, with 80–85% of the metal being recoverable by recycling. With the development of PAFCs, the power industry is poised to provide a source of fuel that is clean, efficient, noiseless and abundant.

Although PAFC technology is well suited for use in power plant fuel cell facilities, their high weight-to-power ratio makes PAFC technology a poor fit for use in vehicles, such as zero-emission vehicles (ZEVs), presently needed to reduce pollution in densely populated areas, such as California, New York, and Italy. For these applications, other types of fuel cells, such as Proton Exchange Membrane Fuel Cells (PEMFCs), pose a better solution. PEMFCs offer a technology that has an acceptable power to weight ratio, and which is also clean, efficient and noiseless. Today, Ballard Power Systems of Vancouver has already installed experimental PEMFCs several on cars and buses in the US.

These experimental systems show encouraging results, and it is now widely recognized that PEMFC technology holds tremendous promise to replace internal combustion engines for vehicular applications. PEMFCs offer superior fuel economy and almost zero emission of air pollutants, and can attain the performance goals of the DOE/industry Partnership for a New Generation Vehicle (PNGV).

However, to deploy PEMFCs into vehicles on a cost-effective basis requires PEFMCs that are low-cost, and reliable. This is an issue for all fuel cells, including PEMFCs, which employ costly metal catalysts, such as platinum and ruthenium, to convert fuel into electrical power, and therefore can have a high material cost. PEMFCs employ a catalyst layer that promotes the reaction of the fuel materials and facilitates the generation of power. Specifically, electrochemical fuel cells use layers of catalyst material to convert fuel and oxidant to electricity and reaction product. For example, fluid reactants can be supplied to a pair of electrodes which are in contact with and separated by an electrolyte. The electrolyte may be a solid or a liquid (supported liquid matrix). PEMFCs generally employ a solid membrane electrode assembly comprising a solid ionomer or ion-exchange membrane disposed between two planar electrodes.

The electrodes typically comprise an electrode substrate and an electro-catalyst layer disposed upon one major surface of the electrode substrate. The electrode substrate typically comprises a sheet of porous, electrically conductive material, such as carbon fiber paper or carbon cloth. The layer of electro-catalyst is typically in the form of finely comminuted metal, typically platinum, and is disposed on the surface of the electrode substrate at the interface with the membrane electrolyte to induce the desired electrochemical reaction.

At the anode, the fuel is oxidized at the anode electro-catalyst layer. At the cathode, the oxidant moves through the porous cathode substrate and is reduced at the cathode electro-catalyst layer. A selective, insulating ion-exchange membrane between the cathode and anode facilitates the migration of protons from the anode to the cathode.

The electro-catalyst is typically provided as a thin layer adjacent to the ion-exchange membrane (see U.S. Pat. Nos. 5,132,193 and 5,409,785). The electro-catalyst layer is typically applied as a coating to one major surface of a sheet of porous, electrically conductive sheet material or to one surface of the ion-exchange membrane.

These electro-catalyst layers compromising platinum and platinum-group elements, both for anode and cathode, are presently a high-cost component of PEMFCs. Studies have shown that the catalyst accounts for $2–3 of the total cost of $15–21/kilowatt. Most of the fuel cell cost is related to the membrane area via current collectors, seals, etc. Accordingly, there is a desire to achieve cost reduction through higher catalyst efficiency by increasing the power per unit area.

Existing techniques for applying catalytic material to the proton exchange membrane produce inefficient loading of catalytic material. For example, as described in the above-identified US Patents, the electro-catalyst layers are commonly formed through liquid slurry infiltration processes that impregnate the platinum into the porous graphite membrane electrode assemblies (MEA) and/or the polymer membrane surface. However, catalyst material is most effective when located proximal the membrane surface and the graphite MEA. The slurry infiltration technique often wastes catalyst because it deposits the catalysts in large chunks deposited too deeply into the electrode material to contribute to electro-catalysis.

Using moderate to low precious metal loading while enhancing catalyst activity and cell performance is the research goal for the PEMFC development community. Substantial progress has been made, but further cost reduction must be achieved in order to enable practical vehicular applications.

Additionally, the efficiency of fuel cells turns in part on the quality of the electrical circuit formed within the cell. However, existing techniques for forming the electro-catalyst layer produce MEAs that have poor electrical connection between the membrane electrolyte and the catalytic material. This poor connection leads to high internal resistance, reducing the power that can readily be produced by these cells. Thus, there is a need for MEAs with lower internal resistance and better electrical connectivity between the membrane and catalytic layer.

SUMMARY OF THE INVENTION

In one embodiment, the invention comprises an admixture of an ionomer material, an electrically conductive material and a catalyst. Examples of such materials can include a proton conducting polymeric material, such as Nafion, a conducting material such as graphite and a catalyst such as platinum. The admixture can be employed as an electro-catalyst layer for a PEMFC. To this end, the catalyst can be co-deposited with a spray of Nafion solution onto a surface of a substrate of solid Nafion material. The codeposited Nafion and catalyst can impregnate the near-surface region of the solid Nafion substrate, and build onto the impregnated surface a film of the codeposited Nafion and catalyst. Accordingly, in one embodiment, the codeposited electro-catalyst layer comprises a region at and near the surface of the Nafion substrate which comprises intimately mixed Nafion and catalyst nano-crystallites and which can be between 0.1 and 20 microns thick.

The structure of this electro-catalyst layer avoids the problems with conventional electro-catalyst layers, wherein catalyst particles are deeply embedded within the membrane where they cannot contribute to cell electrochemistry.

In a further embodiment, the catalyst particles can also be formed near the surface and in the pores of the graphite fibers of an electrode assembly. The structure of this electro-catalyst layer similarly avoids the problems with conventional electro-catalyst layers, wherein catalyst particles are deeply embedded within a porous carbon electrode where they cannot contribute to cell electrochemistry.

Optionally, micron-scale conductive spires or granules of a variety of electrically conductive materials can be embedded to enhance gas permeation: hydrogen at the anode; oxygen and water vapor at the cathode.

In a further embodiment, a conducting material, such as graphite, can be deposited as fibers to provide a porous substrate and the nano-particles of catalyst and solution of Nafion can be codeposited with the graphite fibers to provide a porous substrate. The porous substrate can comprise graphite fibers having a conformal layer of catalyst and Nafion.

Other aspects and embodiments of the invention will be apparent from the following description of certain illustrative embodiments.

BRIEF DESCRIPTION OF THE FIGURES

The following figures depict certain illustrative embodiments of the invention in which like reference numerals refer to like elements. These depicted embodiments are to be understood as illustrative of the invention and not as limiting in any way.

DETAILED DESCRIPTION OF THE ILLUSTRATED EMBODIMENTS

The materials and processes according to the invention will now be explained with reference to certain illustrated embodiments, and in particular to certain illustrated embodiments that can be employed as materials and processes for use as membrane-electrode assemblies in a fuel cell. These materials can include co-deposited compositions of an ionomer, a conducting material and a catalytic material. However, the invention is not to be limited to the embodiments described and depicted herein, but instead it will be realized that the invention embodies many alternative materials, as well as many alternative devices and processes that can employ the materials described herein. For the purposes of illustrating the invention, the materials and processes described herein will be explained with reference to a membrane-electrode assembly of the type employed with PEMFCs. However, other applications are readily seen by those of skill in the art. These applications can include any application wherein an assembly is employed for forming an electrical connection and in particular, any application for catalyzing a surface reaction that generates an electrical current. These alternative applications can include, without limitation, applications for developing membrane-electrode assemblies for fuel cells other than PEMFCs, as well as assemblies for promoting electrolysis to treat waste water, and for hydrogen separation.

Figure 1:
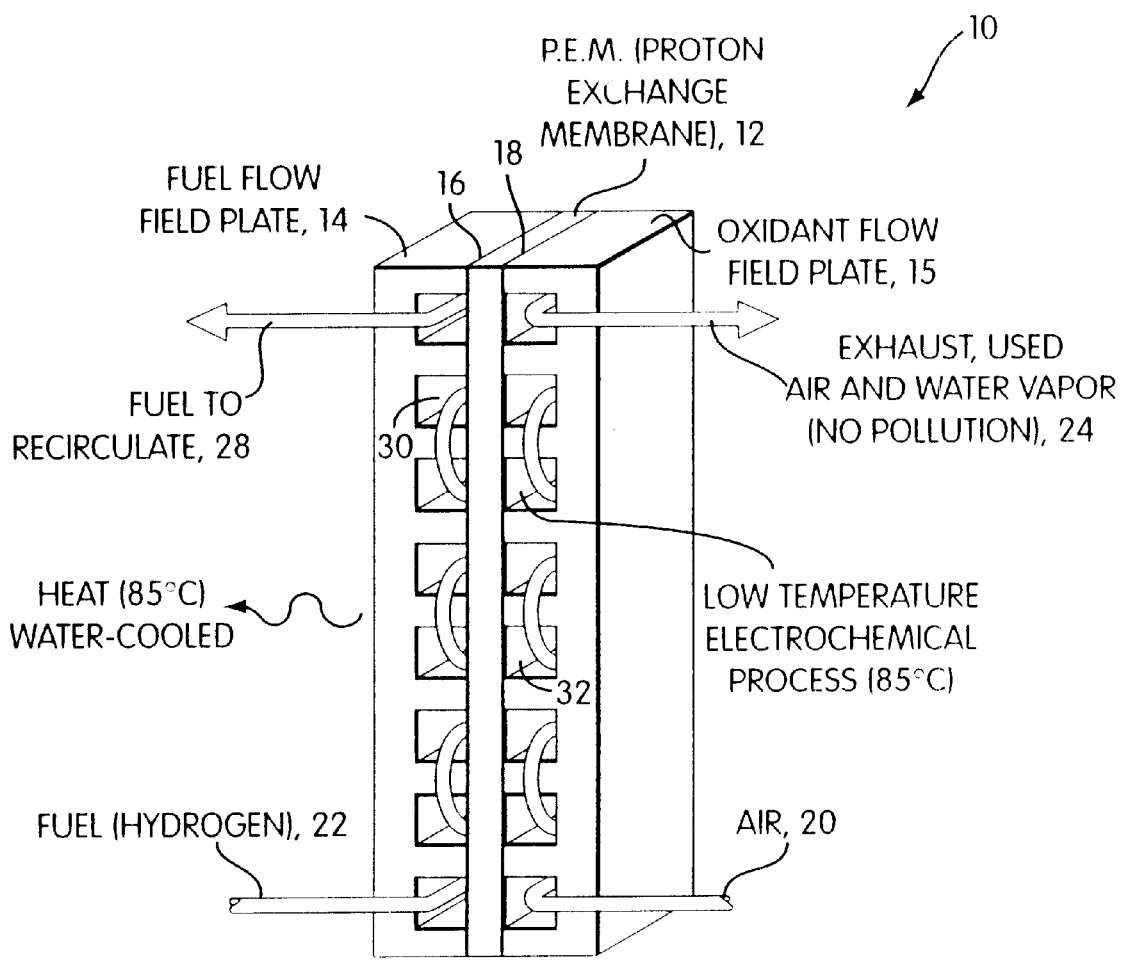
FIG. 1 depicts a functional block diagram of a fuel cell having a solid electrolyte.

FIG. 1 depicts a fuel cell 10 that includes a membrane-electrode assembly (MEA) according to the invention. Generally, the depicted fuel cell 10 is an electrochemical device that produces electricity by processing fuel, such as hydrogen and oxygen. The core of the depicted fuel cell consists of two electrodes, the anode and the cathode, separated by a polymer membrane electrolyte. Each of the electrodes is carried on one side of the MEA. The electrode substrate has a porous structure which renders it permeable to fluid reactants and products in the fuel cell. The MEA also includes an electrocatalyst, typically a coating of a thin layer of catalytic material, such as platinum, disposed at each membrane/electrode layer interface. The electrocatalyst layer can induce the desired electrochemical reaction in the fuel cell. At the anode, hydrogen fuel catalytically dissociates into free electrons and protons (positive hydrogen ions). The free electrons are conducted in the form of usable electric current through an external circuit. To this end, the electrodes are electrically coupled to provide a path for conducting electrons between the electrodes through an external load. The protons migrate through the membrane electrolyte to the cathode where they combine with oxygen from a gas stream such as air and electrons from the external circuit to form water and heat. Individual fuel cells can be combined into fuel cell stacks to provide the amount of electrical power required for the application.

Turning to FIG. 1, it can be seen more particularly that the depicted fuel cell 10 is a solid polymer fuel cell that includes an MEA 12 consisting of an ion-exchange membrane acting as a solid polymer electrolyte, and being interposed between two electrodes, namely an anode 16 and a cathode 18. The anode 16 and cathode 18 can comprise a substrate layer disposed on the solid polymer electrolyte and formed, at least in part, of a porous electrically conductive sheet material. Each substrate can also provide a thin layer of electrocatalyst disposed on one major surface of the MEA 12. The depicted MEA 12 is interposed between an anode flow field plate 14 and a cathode flow field plate 15. The depicted anode flow field plate 14 has a fuel flow channel 30 that is engraved, milled or molded into the surface of the anode flow field plate 14. Similarly, the cathode flow field plate 15 has at least one oxidant flow channel, such as the depicted flow channel 32, that is engraved, milled or molded into one surface of the field flow plate 15, that surface being the surface that faces the cathode 18. When assembled against the cooperating surfaces of the MEA 12, the channels 30 and 32 form the reactant flow field passages for the fuel and oxidant respectively. This fluid flow occurs by action of the depicted air supply 20, a fuel supply 22, an exhaust port 24 and a fuel recirculation port 28.

As described above, the reaction promoted by the catalytic layer induces an electrical current that is carried through the conductive plates 38 and 40. The depicted conductive plates 38 and 40 can butt against the catalytic layers of the MEA 12. In one embodiment, the conductive plates 38 and 40 comprise flat carbon electrodes formed of vulcanized XC72 carbon, of the type provided by the Cabot Corporation. The conductive plates 38 and 40 directly contact the catalytic layer and are in electrical communication therewith.

Figure 2:
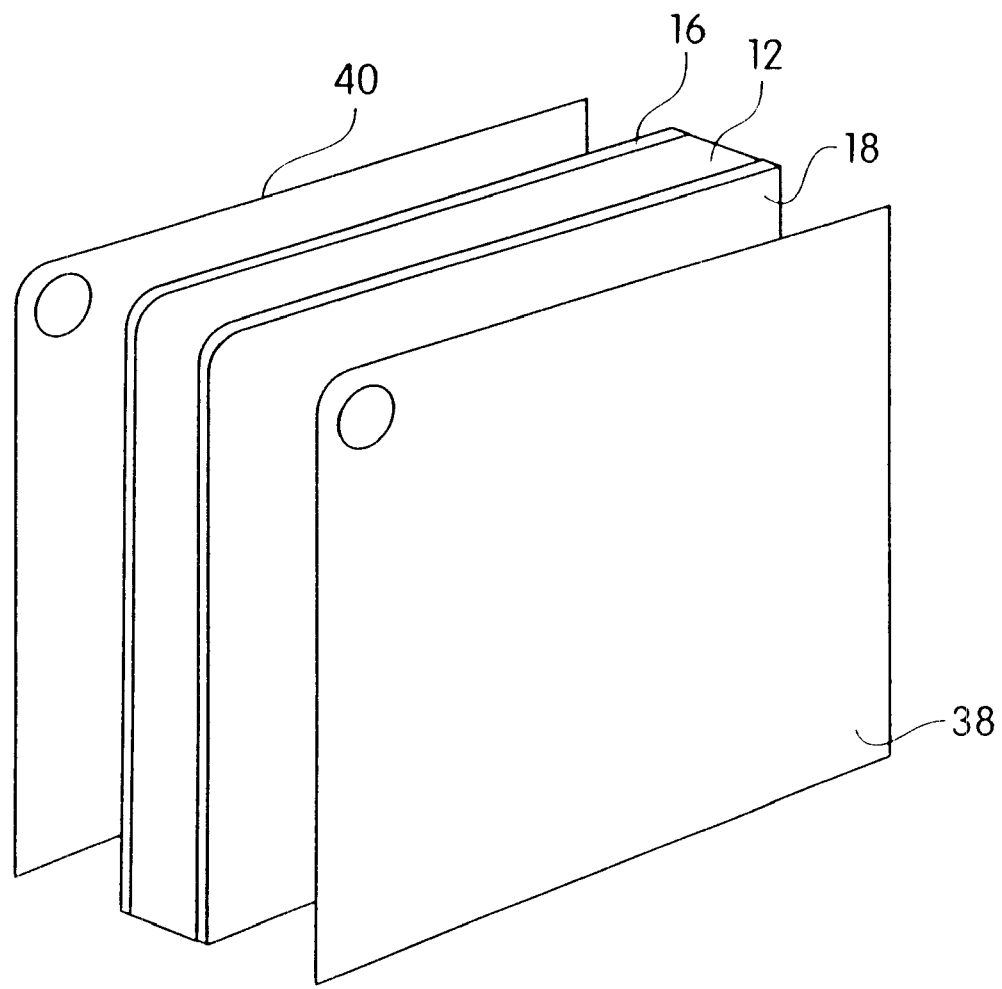
FIG. 2 depicts in more detail the fuel cell depicted in FIG. 1.

FIG. 2 depicts in greater detail the MEA 12 depicted in FIG. 1. Specifically, FIG. 2 depicts that the embodiment of the MEA 12 includes an ion conductive membrane that carries on either of its surfaces the anode 16 and cathode 18, and can contact the cathode conducting plate 38 and the anode conducting plate 40. At least one of the electrode portions of the depicted MEA 12 includes a catalytic electrode material, such as platinum, in contact with the solid polymer electrolyte, also understood as an ionomer membrane or an ion conductive membrane (ICM).

As is generally known to those of skill in the art, ionomer membranes are used in electrochemical cells as solid electrolytes. Ionomer membranes eliminate the need for complex electrolyte subsystems and the precise controls otherwise necessary to maintain a fixed, three-phase boundary in a fuel cell. There are many ionomer membranes currently being investigated for fuel cell applications. These include proton exchange membranes such as the Ballard/Dow membrane, manufactured by Ballard Power Systems of Vancouver, Canada; the Nafion series of membranes, manufactured by DuPont Chemical Company of the United States; the Flemion series of membranes, manufactured by Asahi Glass Co. of Japan; and the DAIS membrane, manufactured by DAIS Company of Palm Harbor, Fla. Additionally, composite ion-exchange membranes have been prepared by impregnating commercially available porous polytetrafluoroethylene film (Gore-tex ™) with Nafion ™, a perfluorosulfonate ionomer. These composite membranes have been described in The Journal of the Electrochemical Society, Vol. 132, pp. 514–515 (1985). The major goal in the study was to develop a composite membrane with the desirable chemical and mechanical features of Nafion ™, but which could be produced at low cost. The study suggested that the polymer loadings necessary to produce these composite membranes would yield membranes that were a low cost alternative to more costly perfluorosulfonic acid membranes. The depicted MEA 12 can include any of these membranes, or any other suitable membrane, and the use of such alternative membranes, or other membranes that vary in thickness and in chemical composition, will not depart from the scope of the invention.

The ionomer membranes can also be used in cooperation with other devices or agents to improve performance or achieve additional functions. For example, the most typical ionomer membrane for a fuel cell application is a proton exchange membrane. In a proton exchange membrane, acid groups, covalently attached to the membrane, facilitate the transit of protons from one side of the membrane to the other. The transport of protons ions within the membrane proceeds via a mechanism that includes a Grothius chain-type mechanism. Therefore, water molecules are normally required for hydrogen ion transport. If the ionomer membrane is not sufficiently hydrated, hydrogen ion transfer will be attenuated, and the fuel cell's performance can degrade. In extreme cases, dehydration of the membrane at elevated temperatures can lead to cracking of the membrane and loss of its ion-conducting capability. Recently, it has been reported that doping the ionomer membrane with a heteropoly acid can help alleviate the dehydration problem by substituting non-volatile acid groups for water in the membrane. The depicted MEA 12 can optionally include an ionomer membrane that includes a heteropoly acid to reduce problems with hydration. Other variations in chemical composition that improve or extend membrane performance can also exist without departing for the scope of the invention.

Similarly, the most common catalyst material is platinum, however any suitable catalyst material can be employed including other elements in the same periodic group, namely iridium, rhodium, osmium and ruthenium. Other transition metals can also be employed. Furthermore, the catalytic materials employed with the compositions described here can include ternary alloy catalysts for fuel cells, including alloy catalysts comprising platinum and gallium, as discussed in U.S. Pat. No. 4,880,711 to Luczak et al. Additional elements of the catalysts can include chromium, cobalt, nickel and/or mixtures thereof, and the actual catalyst employed can be selected according to the application.

For purposes of clarity, the MEA 12 will be described with reference to an ionomer membrane of the type manufactured by the DuPont company, and sold under the tradename Nafion. Nafion eliminates the need for complex electrolyte subsystems and the precise controls otherwise necessary to maintain a fixed, three-phase boundary in a fuel cell. Nafion is a proton exchange type of ionomer membrane. Acid groups, bonded within the membrane, facilitate the transit of protons from one side of the membrane to the other. The transport of protons within the membrane proceeds via a Grothius chain mechanism and, therefore, four to six water molecules are required for each hydrogen ion transported. The Nafion membrane comprises an essentially smooth, two-dimensional material body. The membrane presents an inherent impediment to extending a three-phase boundary into a third spatial dimension. In addition, ionomer membranes have a tendency to expand when wet. Consequently, it has been found difficult to attach a high-surface area electrode onto the ionomer membrane surface.

To address this problem, the depicted fuel cell 10 includes an MEA 12 that comprises on each of its major surfaces a codeposited mixture of Nafion, graphite and platinum. The codeposited mixture acts as an electro-catalyst layer that is intimately bonded to the surface of the Nafion substrate and that gradually transitions in composition to form an electrically conductive porous surface that can act as a high surface area electrode, suitable for joining into electrical circuit with a respective one of the anode flow field plate 14 or the cathode field flow plate 15.

Figure 3:
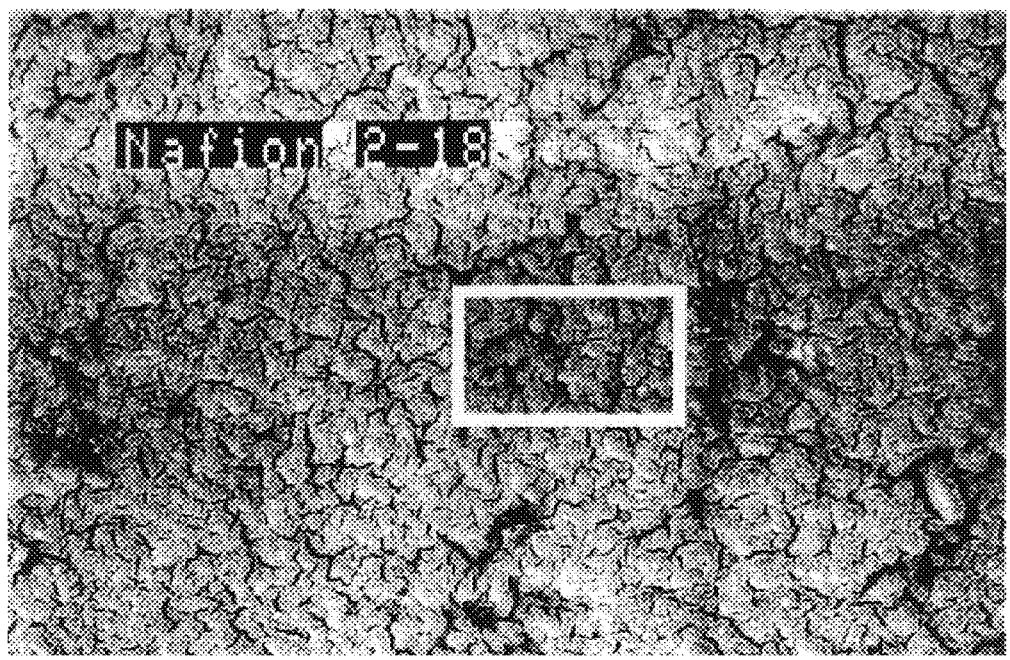
FIGS. 3 and 4 provide a micrograph of a catalyst coated ionomer substrate that can be employed with the fuel cell depicted in FIG. 2.
Figure 4:
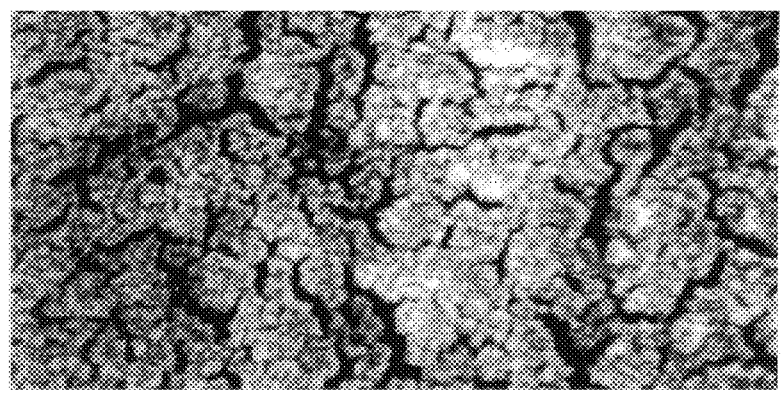

FIGS. 3 and 4 depict a micrograph of a platinum-coated Nafion substrate that provides a catalytic layer for promoting reactions. FIG. 3 is a 5,000×magnification of the substrate surface and FIG. 4 is a 50,000×magnification of the substrate surface. The depicted layer of platinum is representative of the types of electro-catalyst layers that can be formed by the present invention. As shown by FIG. 3, the platinum layer is provided as an even, continuous, and very fine grained platinum coating obtained using a combustion chemical vapor deposition (CCVD) process. Analysis at 200,000×magnification identifies platinum grain sizes of 5 to 10 nm in diameter. The small particle size achieved by the CCVD process provides a substantially conformal coating on the Nafion. Contact between the Nafion and the platinum is excellent as the platinum material can be co-deposited along with a Nafion material to more completely integrate the platinum onto the major surface of the Nafion substrate. The majority of platinum clusters were less than 30 nm, and preferably less than 10 nm, and still better less than 3 nm. Virtually any loading of catalyst can be achieved as such 10, 20, 50, 100, 150 and 200 $\mu g/cm^2$. Additionally, the electro-catalysts described herein can be employed in a fuel cell that can produce 0.7 V at 1.0 $A/cm^2$ in an air/hydrogen system with a platinum loading of less than 150 $\mu g/cm^2$. The composite material can be located on each major surface of the proton electrolyte substrate and can be intimately mixed with the material of the Nafion substrate.

Figure 5:
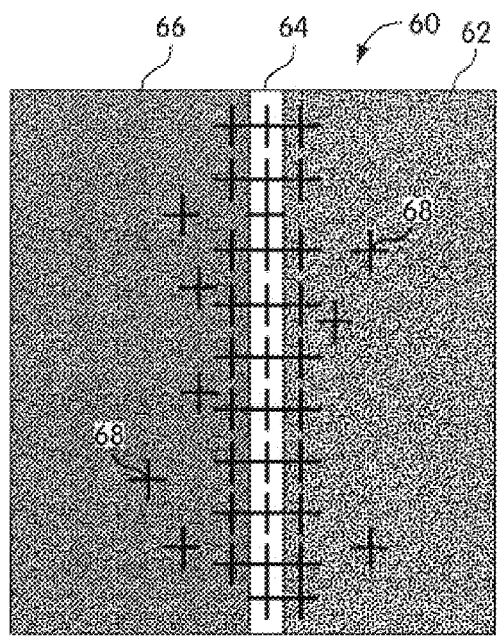
FIG. 5 depicts graphically a substantially continuous concentration gradient of materials that can be achieved in a composition according to the invention.

FIG. 5 depicts figuratively one portion of a MEA according to the invention. Specifically, FIG. 5 shows on the micron scale a cutaway view of the surface of an MEA 60 that includes a Nafion substrate 62 with a thin layer of catalytic material 64 upon which is deposed a conductive layer 66. As shown, the layer of catalytic material 64 can include a plurality of particles, shown in FIG. 5 as the small crosses 68 that can form a layer in between the gas permeable conductive material 66 and the ionomer membrane 62. As described below in more detail, the catalytic material, such as platinum crystals, can be deposited by CCVD processes that form a catalytic layer 64 that is intimately bonded to the ionomer substrate 62. This is depicted in part by FIG. 5 which shows catalytic crystals 68 that extend shallowly into the ionomer substrate. The platinum crystals 68 can be deposited on top of the Nafion substrate 62 to build up a catalytic layer 64.

During the deposition process a conductive material such as graphite fibers can be introduced into the material being deposited to co-deposit the catalytic material 64 along with a conducting material. The proportion of conducting material verses catalytic material can increase until eventually only conducting material is being deposited on top of the catalytic layer 64, thereby producing a conductive substrate 66 that is intimately formed with and in high contact with the catalytic layer 64. Again, the intimate bonding between the conducting material 66 and the catalytic material 68 is shown by the catalytic particles 68 that extend, shallowly, into the conducting layer 66. It can also be observed from viewing FIG. 5 that a gradient of material exists across the thickness of the MEA 60 such that the material transitions from substantially pure Nafion, to an increasing concentration of catalytic material intermixed with the Nafion, to substantially pure catalytic material, then transitioning into catalytic material mixed with the conducting material, eventually becoming a substantially pure conductive material. It is also desired that porosity and gas permeability also increase with the conductive material.

Figure 6:
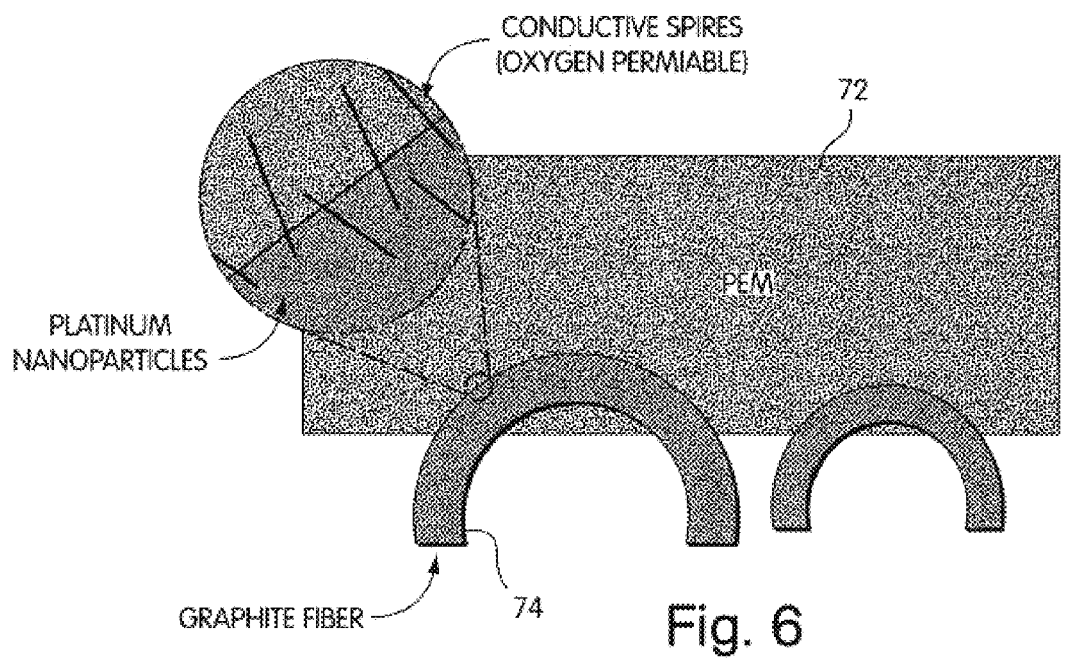
FIG. 6 depicts graphically the molecular structure of one composition according to the invention.

FIG. 6 further depicts the advanced catalytic layer structure achieved by the present invention. Specifically, FIG. 6 depicts that a proton exchange membrane 72 can contact graphite fibers 74. The graphite fibers 74 can form a carbon fiber electrode structure. To form this electrode catalyst layer, the CCVD catalyst can be codeposited with a spray of Nafion solution to impregnate the micron scale membrane near surface region with catalytic nano crystallites. CCVD catalytic particles can also be formed near the surface of the pores in the graphite fibers of the electrode assembly. This provides a structure that has catalytic materials deposited near the surface of the graphite fibers and PEM membrane, thereby avoiding the problem with conventional catalyst methods which can embed catalytic material deep within the membrane and the porous carbon electrode, where the catalytic material cannot contribute to cell electro-chemistry and merely increases the cost due to unnecessary catalytic material loading.

Figure 7:
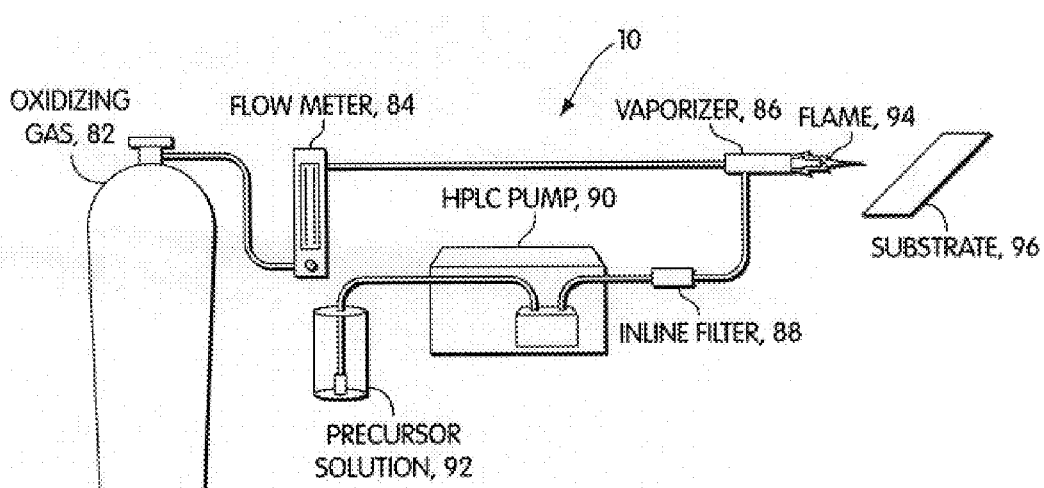
FIG. 7 depicts graphically a process for forming a membrane-electrode assembly.

FIG. 7 depicts one process for the CCVD deposition of the catalytic material onto the ion-conductive material, and depicts a process that also allows for the co-deposition of materials, such as the co-deposition of an ion-conductive material like Nafion along with the deposition of a catalytic material such as platinum. Further embodiments can be achieved wherein compositions of a conducting material such as graphite are co-deposited along with the ion-conductive material and the catalytic material.

FIG. 7 is a functional block diagram that depicts a deposition system 80 for forming an electro-catalyst layer on an ion conducting membrane, such as Nafion. The system 80 depicted in FIG. 7 includes a supply of oxidizing gas 82, a flow meter 84, an atomizer/vaporizer 86, an in-line filter 88, an HPLC pump 90, a precursor 92, and a substrate being treated 96. In a preliminary step, the substrate can be cleaned, such as by etch processing, to prepare the substrate for deposition. As shown in FIG. 7, the components are arranged such that gas from the tank 82 can pass through the flow meter 84 and into the atomizer/vaporizer 86. Simultaneously, precursor solution from supply 92 can be pumped, to or close to the supercritical pressure of the solution, by the high pressure liquid chromatography pump 90 and sent through the inline filter 88, to the vaporizer 86. The vaporizer 86 can atomize the precursor solution and combust the solution to allow for CCVD of the precursor solution on to the substrate 96.

At the distal end of the atomizer/vaporizer 96, the solution can be heated to a temperature near or within the supercritical range of the solution. The heated and pressurized solution can eject from the distal end of the vaporizer 86 as an atomized spray. It is understood that the solution ejected from the vaporizer 86 enters into an atmosphere which is at a sufficiently low pressure to allow for the rapid expansion of the heated and pressurized solution. This rapid expansion results in the formation of submicron particles that can projected onto the substrate surface.

The vaporizer 86 can be similar to the atomizer described in U.S. Patent, and can cause the liquid precursor solution to be vaporized to various degrees, depending on input settings and the precursor solution. A high velocity stream of oxidizing gas is introduced in close proximity to the vaporized precursor solution, creating a vapor-gas mixture. The vapor-gas mixture is then burned and the combustion flame is directed onto the substrate 96 that is being coated. By controlling the deposition, the microstructure of the coating can be varied from smooth and dense to porous and columnar. Adherent nanophase particles with radii of 10 Å to 100 Å or larger can also be deposited. The formation of small, monodispersed particles by the rapid expansion of supercritical or near supercritical solutions has been discussed in the art, including in the above identified patent application, to which this application claims priority, and incorporates the teachings thereof, as well as in Tom et al. *Particle Formation with Supercritical Fluids—A Review*, J. Aerosol Sci., 22, 1991 (p. 555), the teachings of which are also incorporated by reference.

In one particular practice of the process depicted in FIG. 7, the CCVD catalyst can be co-deposited with a spray of Nafion solution to impregnate a micron-scale membrane near surface region with platinum nano-crystallites. To this end, the precursor solution can comprise the catalyst material to be deposited, together with a soluble form of DuPont's Nafion 117 perfluorosulphonic acid polymer electrolyte (obtained as a 5% solution of Nafion 1100 EW from Solution Technology Inc. of Mendenhall, Pa., USA). In an optional separate operation, CCVD Pt particles can also be formed near the surface in the pores of the graphite fibers of the electrode assembly. This can avoid or reduce the problems with conventional catalyst deposition methods, which can embed catalyst particles deep within the membrane and the porous carbon electrode, where they cannot contribute to cell electrochemistry. In an additional optional step, the process can include the formation of micron scale conductive spires of a variety of materials to enhance gas permeation: hydrogen at the anode; oxygen and water vapor at the cathode. PVD and CVD can be used to obtain such columns or spires.

FIG. 8 provides an SEM of a co-deposited composition of graphite, Nafion and platinum, that can be formed using the system depicted in FIG. 7. In FIG. 8, the co-deposited composition was formed in the practice of making an MEA, the composition would be deposited onto an ionomer membrane. To facilitate the XRD analysis of the composition, the results of which are depicted in FIG. 9, copper was used as the substrate, as copper is a material that has limited effect on the results of the XRD analysis.

Figure 8A:
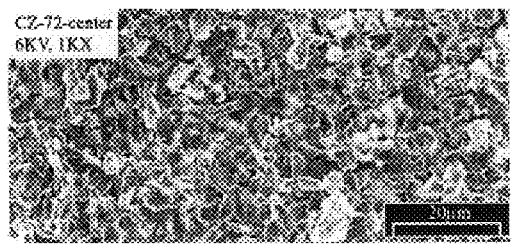
FIGS. 8a and 8b present scanning electron microscopy pictures of a codeposited composition of graphite, Nafion and platinum.
Figure 8B:
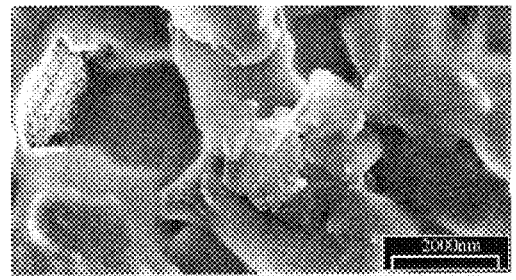

FIGS. 8a and 8b and shows the composition at a base magnification and at an enhanced magnification, wherein 2000 nm corresponds to one centimeter. FIG. 8 shows that the fibers of the deposited graphite provide a porous layer of a conductive material. The porous layer allows for gas and fuel to permeate the graphite and contact the ionomer membrane that would support the depicted composition. Adhering to the graphite fibers and coating the fibers are the platinum crystals and the Nafion particles. The roughness of the graphite increases the surface area of the substrate and can more efficiently place the catalyst in contact with the material being processed by the MEA. The solution flow rates for the processes can be between 1 and 100 cc per minute depending on the conditions and the application.

FIG. 8 shows that the compositions described herein can provide an effective MEA design that maximizes contact between the catalyst and the ionomer electrolyte in order to obtain higher efficiency and capacity to handle higher currents. Specifically, the compositions described herein provide an improved interface between the catalyst, the ionomer and the gaseous reactants. To that end, the porous graphite fibers coated with the nano particles of catalyst material work to optimize catalyst utilization by maximizing the surface area of catalyst which is in contact with the ionomer, to effectively facilitate the exchange of protons between the catalyst surface site of the redox reactions and the ionomer membrane. This reduces the amount of catalyst that is not in direct contact with the ionomer nor near the gas interface and electrical conductor, and which would be "non-participating" catalyst.

Figure 9:
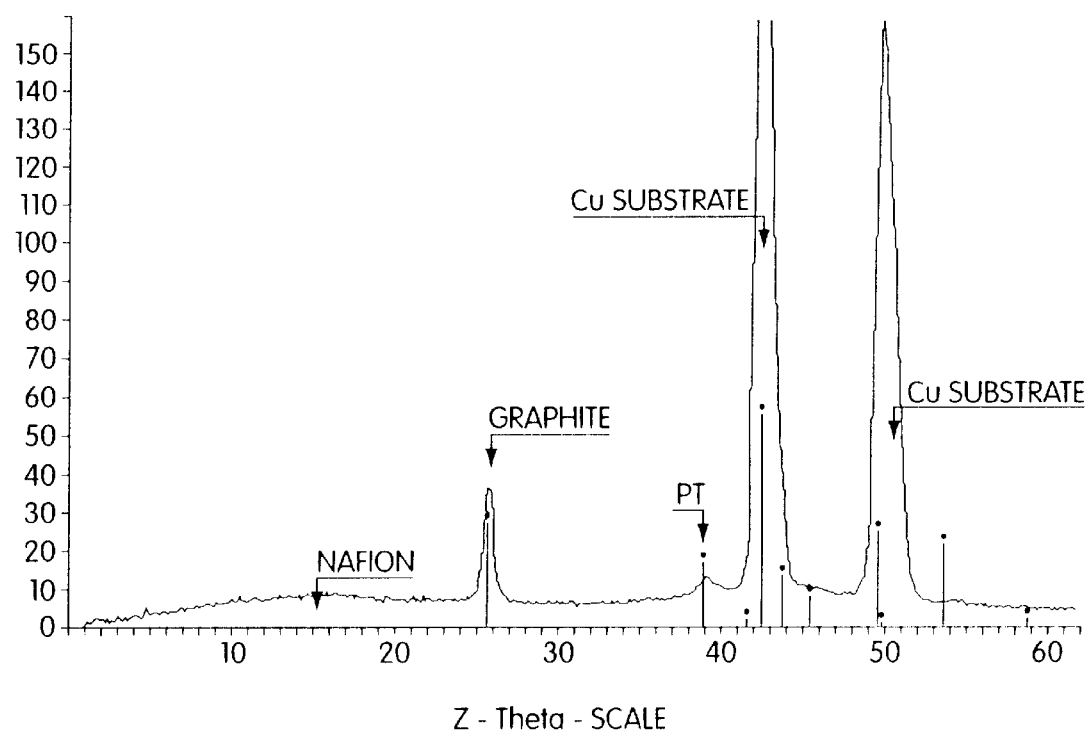
FIG. 9 depicts an x-ray diffraction pattern for the codeposited composition of FIGS. 8a and 8b.
Figure 10:
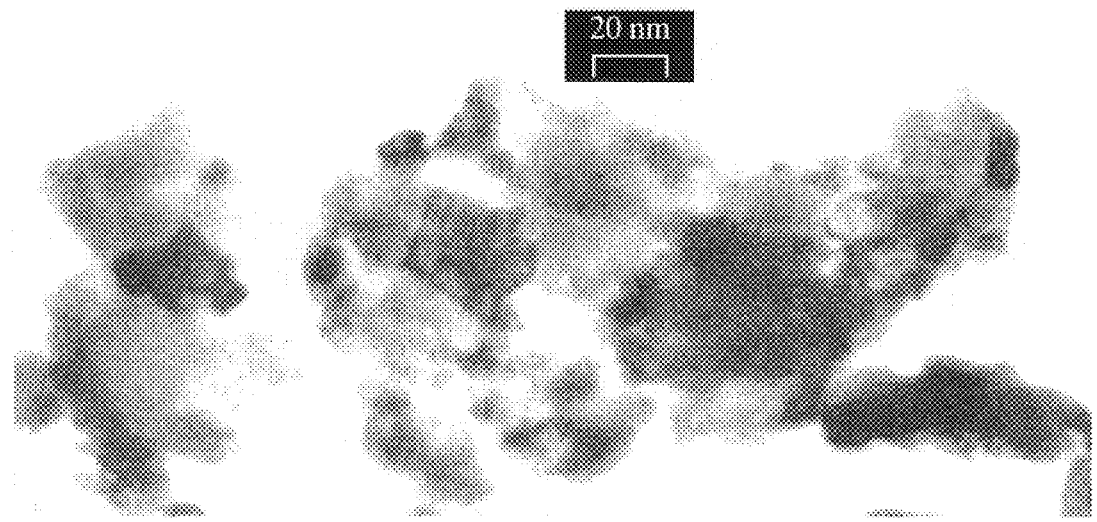
FIG. 10 provides a TEM micrograph illustrating a platinum nano-particle coating on Nafion clusters.

FIG. 9 depicts the XRD patterns of the composition depicted in FIG. 8. As shown, the composition includes graphite, Nafion and platinum. The platinum exists in a very small crystalline phase, with particle sizes of less than 4 nm. The Nafion particles can be on the same scale, as is suggested by the low, widespread pattern achieved for Nafion during the XRD analysis.

We now turn to more specific examples of compositions according to the invention.

EXAMPLES

Examples of catalytic layers according to the invention were produced and tested. Results included proton exchange membranes coated with 0.01–0.2 mg/cm$^2$ loadings of platinum. These membranes were then tested successfully as components in a fuel cell assembly.

Specifically, catalytic layers for PEMFCs were formed by deposition of platinum metal on to Nafion membranes. To this end, a test bed, similar to the system 80 depicted in FIG. 7, was constructed that included, a high-pressure liquid chromatography (HPLC) pump and an atomizing device. The atomizing device was similar to the devices described in U.S. Pat. Nos. 5,652,021 and 5,858,465; and WO 97/05994. The test bed allowed automated motion of the substrate being coated in the x and y directions in front of the deposition flame. Conventional systems can be employed for providing such x–y movement, including providing the substrate as a spool of material that can be turned on a pair of rollers to allow the material wind off the spool like a web of material. The material can pass under the atomizing device for deposition of the catalyst and other materials. Optionally, the test bed can employ a plurality of atomizing devices to form a row of spray nozzles that can coat a wide swatch of the web as it passes under the multiple nozzles. This fixture can also be aligned to a cooling air tube disposed opposite the deposition nozzle, to provide substrate cooling as it passed in front of the flame.

The HPLC pump delivers a precursor-containing solution to the atomizing device. The atomizer/vaporizer causes the liquid precursor solution to be vaporized to various degrees, depending on input settings and the precursor solution. A high velocity stream of oxidizing gas is introduced in close proximity to the vaporized precursor solution, creating a vapor-gas mixture. The vapor-gas mixture is then burned and the combustion flame is directed onto the base material being coated. By controlling these depositions, the microstructure of the coating can be varied from smooth and dense to porous and columnar. Test results show that adherent nanophase particles with radii of 10 Å to 100 Å can be deposited. Note that flame temperature and actual substrate temperature are not the same.

During experiments, thin films were deposited onto cooled substrates that were kept in a region of the flame where the flame plasma temperature was above the substrate melting and/or oxidation temperature. As a result, the chemical reactions can occur without destroying the proton exchange membrane or altering, or substantially altering, its properties.

To improve the coating process of these larger samples, multiple samples were processed to determine the effects on deposition time, flame temperature, motion speed, cooling methods, solution precursor type and solution concentration. Results showed that shuttle speed, cooling rate, flame temperature, and deposition time were primary factors in determining the microstructure of depositions.

The resulting films were then analyzed for adhesion to the PEM, visual quality, microstructure, and conductivity. 5" square samples were coated in a 3" square area on both sides for evaluation; these samples presented a range of loadings. 8" square membranes were also coated for to evaluate 2 loadings from 10 to 200 µg/cm$^2$.

Visually, the coatings were shiny and metallic at the highest flame temperatures (800–1000 C); in contrast, when deposited at lower temperatures (450–550 C), the visual result ranged from initially brown, and turned to black as the coating became thicker. Evaluation of these coatings revealed that the low temperature coatings were superior, in some ways, for use as a PEM. Therefore, although deposition was proved to be feasible for temperatures up to 1000 C, optimum catalytic PEM properties were achieved at much lower temperatures. No detrimental effects to the Nafion were measurable.

X-ray diffraction analysis and Scanning Electron Microscopy (SEM) confirmed the deposition of a uniform, fine-grained platinum layer on the surface of the membrane. FIGS. 3 and 4 show the surface of a Nafion membrane that has been coated with platinum. The top portion was taken at a magnification of 5000×; the bottom portion is a 10×magnification of the selected area. The picture demonstrates an even, continuous, and very fine-grained platinum coating. Analysis, at 200,000× magnification confirmed platinum grain sizes of 1–5 nm in diameter. EDX analysis of residue from the coating fixture detected the presence of platinum, calcium, and chlorine. The chlorine and calcium are possible contaminants from the precursor used. Conventional steps can be taken to reduce or eliminate these contaminants in future lots of precursor.

Samples of 5"×5" Nafion were coated (3"×3" deposition area) for evaluation as a component of a PEMFC. The coated membrane was placed between two flat carbon electrodes (Vulcanized XC72, Cabot Corporation) to form a fuel cell assembly. Results obtained included power production of 12 Amps at 0.3 Volts for a 25-cm$^2$ fuel cell. These results indicate that the coating does perform in a fuel cell setup.

An 8"×8" sample of Nafion was also coated and preliminary results were positive. Samples tested provided power production of approximately 0.65V at 1A/cm$^2$ for a sample with 408/cm$^2$ catalytic area when tested in a H2/O2 scheme. This sample had an estimated platinum loading of 80 g/cm$^2$. A further set of samples with increased platinum loading apparently did not improve 2 fuel cell performance. FIG. 7 shows the results from testing for the 80 g/cm$^2$ sample.

Figure 11:
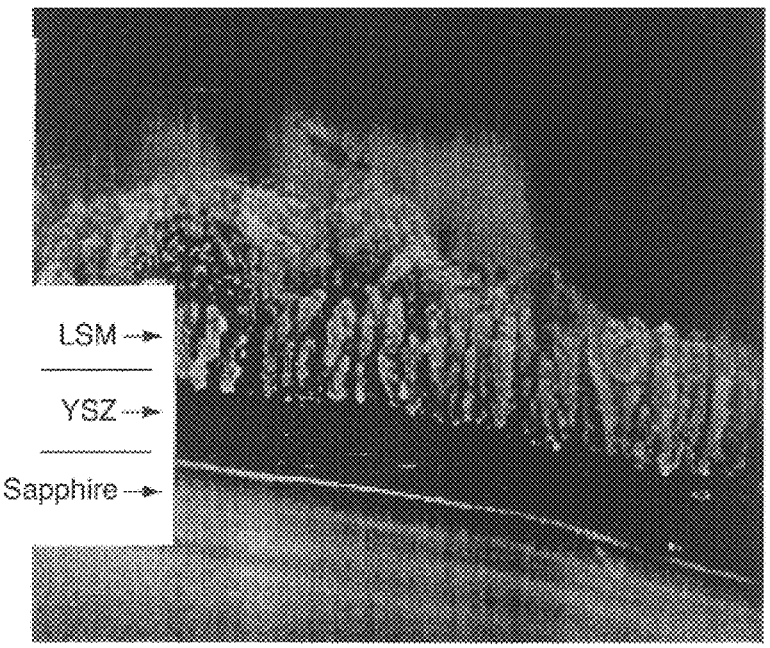
FIG. 11 depicts graphically the open columnar structure of a conductive coating of the type suitable for use with a membrane-electrode assembly.
Figure 12:
FIG. 12 depicts graphically the whisker-like grain structure of a coating of the type suitable for use with a membrane-electrode assembly.

In alternative embodiments, the compositions can include columnar structures of a conducting material, that has been coated, or intimately mixed with a catalytic material and/or an ionomeric material. For illustrative purposes FIG. 11 depicts a cross-sectional view of a columnar crystal conducting material. Specifically, FIG. 11 presents a scanning electron micrograph of a CCVD conductive lanthanum-strontium-manganate (LSM) layer with a "loose" columnar microstructure, which has been deposited on a dense CCVD layer of yttria-stabilized zirconia. The structure depicted in FIG. 11 could be employed with the MEAs described herein to provide increased surface area and increased or controlled gas permeability. Similarly, FIG. 12 displays a structure that can be employed in alternative embodiments of the MEAs described herein. FIG. 12 depicts a very loose micro-scale, whisker-like structure, composed of titanium-oxide crystallites. Although titania is not a conducting oxide, it is understood that similar "whisker" microstructures can be developed for CCVD conducting oxides, as illustrated in FIG. 6.

The systems described above are illustrative of the systems of the invention, and not an exhaustive representation thereof. It will be apparent to one of ordinary skill in the art that various modifications and additions can be made to the systems described herein, without departing from the scope of the invention. For example, the systems described herein can be modified to provide sensors, and waste water treatment systems. Additionally, the systems described herein can be employed in any other system that requires a porous electrode assembly, particularly those employing catalyzed reactions for generating electrical current. Accordingly, the invention will not be limited to the systems disclosed herein, but instead will be understood from the following claims, which will be interpreted as broadly as allowed under the law.

I claim:

1. A membrane-electrode assembly for use in a fuel cell, the assembly comprising
    a porous substrate formed of an electrically conductive material, and
    a substantially conformal layer of a composition comprising an ionomeric material and an intimately mixed catalytic material.

2. The assembly according to claim 1 wherein said ionomeric material comprises a proton-conducting material.

3. The assembly according to claim 1 wherein said ionomeric material comprises a perfluorosulphonic acid polymer electrolyte.

4. The assembly according to claim 1 wherein said composition further comprises fibers of a conducting material.

5. The assembly according to claim 4 wherein said fibers are carbon fibers.

6. The assembly according to claim 1 wherein said composition further comprises particulates of a conducting material.

7. The assembly according to claim 6 wherein said particulates comprise graphite.

8. The assembly according to claim 1 wherein said catalytic material comprises a transition metal.

9. The assembly according to claim 1 wherein said catalytic material comprises a metal selected from the group consisting of platinum, iridium, rhodium, osmium, ruthenium, mixtures thereof and alloys thereof.

10. The assembly according to claim 1 wherein said catalytic material comprises platinum.

11. The assembly according to claim 1 wherein said conformal layer has a gradient of composition of said conformal layer ranging from a catalytic material-rich composition adjacent to said substrate to an ionomeric material-rich composition remote from said substrate.

12. A membrane-electrode assembly for use in a fuel cell, the assembly comprising
    a porous substrate formed of an electrically conductive material, and
    a substantially conformal layer of a composition comprising an ionomeric material and an intimately mixed catalytic material, said conformal layer having at least two different regions spaced at different distances relative to said substrate, each of said regions having different relative compositions of said ionomeric material and said catalytic material.

13. A membrane-electrode assembly for use in a fuel cell, the assembly comprising
    a porous substrate formed of an electrically conductive material,
    a substantially conformal layer of a composition comprising an ionomeric material, an intimately mixed catalytic material, and particulates of a conducting material, said composition having at least two regions comprising ionomeric material, catalytic material, and particulates of a conducting material, said two regions having different relative compositions of at least two of said ionomeric material, said catalytic material and said particulates of a conducting material.

14. An electrode comprising a porous layer of a composition comprising an ionomeric material and an intimately mixed catalytic material, said porous layer having a firt surface having a relatively high concentration of catalytic material relative to said ionomeric material and a second surface having a relatively low concentration of catalytic material relative to said ionomeric material and at least one intermediate region having an intermediate relative composition of catalytic material and ionomeric material.

15. The electrode of claim 14 wherein said first surface is substantially pure catalytic material.

16. The electrode of claim 14 wherein said second surface is substantially pure ionomeric material.

17. The electrode of claim 14 wherein said catalytic material comprises a transition metal.

18. The electrode according to claim 14 wherein said catalytic material comprises a metal selected from the group consisting of platinum, iridium, rhodium, osmium, ruthenium, mixtures thereof and alloys thereof.

19. The electrode according to claim 14 wherein said catalytic material comprises platinum.

20. The electrode according to claim 14 wherein said ionomeric material comprises a proton-conducting material.

21. The electrode according to claim 14 wherein said ionomeric material comprises a perfluorosulphonic acid polymer electrolyte.

22. The electrode of claim 14 having a thickness of about 10 microns or less.

23. The electrode of claim 14 having a thickness of about 1 microns or less.

24. An electrode comprising a porous layer of a composition comprising an ionomeric material and an intimately mixed catalytic material, said porous layer having a first surface having a relatively high concentration of catalytic material relative to said ionomeric material and a second surface having a relatively low concentration of catalytic material relative to said ionomeric material, and having a gradient of relative amounts of said ionomeric material and said catalytic material between said first surface and said second surface.

25. An electrode comprising
a porous layer of a composition comprising an ionomeric material and an intimately mixed conductive material, said porous layer having a first surface having a relatively high concentration of conductive material relative to said ionomeric material and a second surface having a relatively low concentration of conductive material and at least one intermediate region having an intermediate relative composition of said ionomeric material and said conductive material.

26. The electrode of claim 25 having a gradient of relative ionomeric material and conductive material between said first surface and said second surface.

27. The electrode of claim 26 wherein said first surface is substantially pure conductive material.

28. The electrode of claim 26 wherein said second surface is substantially pure ionomeric material.

29. The electrode according to claims 25 wherein said conductive material comprises graphite.

30. The electrode according to claim 25 wherein said conductive material comprises graphite fibers.

31. The electrode according to claim 25 wherein said conductive material comprises graphite particulates.

32. The electrode according to claim 25 wherein said ionomeric material comprises a proton-conducting material.

33. The electrode according to claim 25 wherein said ionomeric material comprises a perfluorosulphonic acid polymer electrolyte.

34. The electrode of claim 25 having a thickness of about 10 microns or less.

35. The electrode of claim 25 having a thickness of about 1 micron or less.

36. The electrode of claim 25 wherein said composition further comprises a catalytic material.

37. The electrode of claim 36 wherein said catalytic material comprises a transition metal.

38. The electrode according to claim 36 wherein said catalytic material comprises a metal selected from the group consisting of platinum, iridium, rhodium, osmium, ruthenium, mixtures thereof and alloys thereof.

39. The electrode according to calim 36 wherein said catalytic material comprises platinum.

40. An electrode comprising, a porous layer of a composition comprising an ionomeric material, a catalytic material, and an intimately mixed conductive material, said porous layer having a first surface having a relatively high concentration of conductive material relative to said ionomeric material and a second surface having a relatively low concentration of conductive material and at least one intermediate region having an intermediate relative composition of said ionomeric material and said conductive material, wherein the concentration of said catalytic material in said composition varies between said first surface and said second surface.

41. A membrane-electrode assembly for use in a fuel cell, the assembly comprising
a porous substrate formed of an electrically conductive material, a substantially conformal layer of a composition comprising an ionomeric material an intimately mixed catalytic material, and particulates of a conducting material,
wherein at least a portion of said catalytic material is unsupported by said particulates of conducting material.

42. A process for forming an electro-catalytic layer on a substrate comprising
providing a first fluid that provides catalytic material,
providing a second fluid containing a ionomeric material,
separately atomizing each of said first and said second fluids to provide first and second aeorosols, and
codepositing said first and second materials on said substrate.

43. The process according to claim 42 wherein said second fluid contains particulates of conducting material.

44. The product of the process of claim 42.

45. A process for forming an electro-catalytic layer on a substrate comprising
providing a first fluid that provides catalytic material,
providing a second fluid containing an ionomeric material,
separately atomizing each of said first and second fluids to provide first and second aerosols, and codepositing said first and second materials on said substrate, wherein during said co-depositions the relative amounts of catalyst provided by said first aerosol and ionomer provided by said second aerosol are varied so as to produce at least a first region having both catalyst and ionomer at a first relative ratio of catalyst to ionomer and at least a second region having both catalysy and ionomer at a second relative ratio of catalyst to ionomer that is different than said first region.

46. A process for forming an electro-catalyst layer on a substrate comprising, providing a fluid containing a precursor of a catalytic material, providing a fluid containing an ionomeric material, atomizing said fluid containing said precursor and said fluid containing said ionomeric material and co-depositing said atomized fluids on said substrate, and during said deposition chemically converting said precursor to catalytic material.

47. The process of claim 46 wherein particulates of conducting material are co-deposited along with said ionomeric material and said precursor.

48. The process according to claim 47 wherein said particulates of conducting material are deposited from said fluid containing said ionomeric material.

49. The process according to claim 47 wherein said particulates of conducting material comprise carbon.

50. The process according to claim 49 wherein said precursor is a precursor for platinum.

51. The product of the process of claim 46.

52. A process for forming an electro-catalyst layer on a substrate comprising, providing a fluid containing a precursor of a catalytic material, providing a fluid containing an ionomeric material, atomizing said fluid containing said precursor and said fluid containing said ionomeric material and co-depositing said atomized fluids on said substrate, and during said deposition providing thermal energy to said fluid containing said precursor to chemically convert said precursor to catalyst.

53. A process for forming an electro-catalyst layer on a substrate comprising, providing a fluid containing a precursor of a catalytic material, providing a fluid containing an ionomeric material, atomizing said fluid containing said precursor and said fluid containing said ionomeric material and co-depositing said atomized fluids on said substrate, and during said deposition chemically converting said precursor to catalytic material, and during said co-deposition the relative amounts of said fluid containing said precursor and said fluid containing said ionomeric material are varied so as to produce at least one region of higher concentration of catalytic material relative to said ionomeric material and at least one region of lower concentration of catalytic material relative to said ionomeric material.

54. A process for forming an electrode assembly, comprising the steps of providing an electrode substrate formed of an electrically conducting material, atomizing a fluid containing a precursor of a catalytic material, and depositing said atomized fluid on said electrode substrate while chemically converting said preener material to catalytic material.

55. The product of the process of claim 54.

56. A process for forming an electrode assembly, comprising the steps of providing an electrode substrate formed of an electrically conducting material, atomizing a fluid containing a precursor of a catalytic material, depositing said atomized fluid on said electrode substrate, and during said deposition providing thermal energy to said atomized fluid to chemically convert said precursor to catalytic material.

* * * * *

UNITED STATES PATENT AND TRADEMARK OFFICE
CERTIFICATE OF CORRECTION

PATENT NO. : 6,403,245 B1
DATED : June 11, 2002
INVENTOR(S) : Hunt et al.

It is certified that error appears in the above-identified patent and that said Letters Patent is hereby corrected as shown below:

<u>Title page,</u>
Item [75], Inventors, insert the following: -- Jan Tzyy-Jiuan Hwang, Alpharetta, GA --

Signed and Sealed this

Twenty-second Day of October, 2002

Attest:

Attesting Officer

JAMES E. ROGAN
Director of the United States Patent and Trademark Office